US012810536B2

(12) United States Patent
Zhang

(10) Patent No.: US 12,810,536 B2
(45) Date of Patent: Nov. 24, 2026

(54) EFFECT PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventor: Yuanhuang Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 83 days.

(21) Appl. No.: 18/978,304

(22) Filed: Dec. 12, 2024

(65) Prior Publication Data

US 2025/0209731 A1 Jun. 26, 2025

(30) Foreign Application Priority Data

Dec. 22, 2023 (CN) ........................ 202311789674.X

(51) Int. Cl.
*G06T 15/20* (2011.01)

(52) U.S. Cl.
CPC .................................... *G06T 15/20* (2013.01)

(58) Field of Classification Search
None
See application file for complete search history.

(56) References Cited

U.S. PATENT DOCUMENTS

2020/0358996 A1 11/2020 Cheng
2023/0013663 A1* 1/2023 Liu ....................... A63F 13/837
2023/0247178 A1* 8/2023 Yin ...................... G06V 40/174
348/14.08

FOREIGN PATENT DOCUMENTS

CN 107767437 A 3/2018
CN 108647313 A 10/2018
CN 113426112 A 9/2021

OTHER PUBLICATIONS

China National Intellectual Property Administration, Search Report Issued in Application No. 202311789674X, Jul. 9, 2026, 4 pages.

* cited by examiner

*Primary Examiner* — Frank S Chen
(74) *Attorney, Agent, or Firm* — Alleman Hall LLP

(57) ABSTRACT

Embodiments of the present disclosure provide an effect processing method and apparatus, an electronic device, and a storage medium. The method includes: obtaining, in response to an effect trigger operation, a target effect object to be added and an associated resource to be used on the target effect object, where the target effect object includes a first effect object and a second effect object, and the associated resource is to be used on the second effect object; obtaining a first effect resource corresponding to the first effect object and an object rendering parameter corresponding to the second effect object, where the first effect resource includes a media resource containing the first effect object; and displaying the first effect object in an effect image by displaying the media resource, and rendering the second effect object in the effect image based on the object rendering parameter and the associated resource.

20 Claims, 4 Drawing Sheets

EFFECT PROCESSING METHOD AND APPARATUS, ELECTRONIC DEVICE, AND STORAGE MEDIUM

CROSS-REFERENCE TO RELATED APPLICATION(S)

This application claims priority to Chinese Application No. 202311789674.X filed on Dec. 22, 2023, the disclosure of which is incorporated herein by reference in its entirety.

FIELD

Embodiments of the present disclosure relate to the computer application technology, and in particular, to an effect processing method and apparatus, an electronic device, and a storage medium.

BACKGROUND

With the development of image processing technology, adding effects in a process of image or short video processing has become an image processing method popular with users. For example, an effect image is generated through a method for adding an effect object in an image.

SUMMARY

In a first aspect, an embodiment of the present disclosure provides an effect processing method. The method includes:

- obtaining, in response to an effect trigger operation, a target effect object to be added and an associated resource to be used on the target effect object, wherein the target effect object comprises a first effect object and a second effect object, and the associated resource is to be used on the second effect object;
- obtaining a first effect resource corresponding to the first effect object and an object rendering parameter corresponding to the second effect object, wherein the first effect resource comprises a media resource containing the first effect object; and
- displaying the first effect object in an effect image by displaying the media resource, and rendering the second effect object in the effect image based on the object rendering parameter and the associated resource.

In a second aspect, an embodiment of the present disclosure further provides an effect processing apparatus. The apparatus includes:

- an effect triggering module, configured to obtain, in response to an effect trigger operation, a target effect object to be added and an associated resource to be used on the target effect object, wherein the target effect object comprises a first effect object and a second effect object, and the associated resource is to be used on the second effect object;
- a resource obtaining module, configured to obtain a first effect resource corresponding to the first effect object and an object rendering parameter corresponding to the second effect object, wherein the first effect resource comprises a media resource containing the first effect object; and
- an effect display module, configured to displaying the first effect object in an effect image by displaying the media resource, and render the second effect object in the effect image based on the object rendering parameter and the associated resource.

In a third aspect, an embodiment of the present disclosure further provides an electronic device. The electronic device includes:

- one or more processors; and
- a storage, configured to store one or more programs, where
- the one or more programs, in a case that executed by the one or more processors, cause the one or more processors to implement the effect processing method according to any of the embodiments of the present disclosure.

In a fourth aspect, an embodiment of the present disclosure further provides a storage medium including computer-executable instructions. The computer-executable instructions, in a case that executed by a computer processor, perform the effect processing method according to any of the embodiments of the present disclosure.

BRIEF DESCRIPTION OF THE DRAWINGS

The above and other features, advantages, and aspects of various embodiments of the present disclosure will become more apparent with reference to the accompanying drawings and the following specific implementations. Throughout the accompanying drawings, the same or similar reference numerals denote the same or similar elements. It should be understood that the accompanying drawings are illustrative, and components and elements may not necessarily be drawn to scale.

DETAILED DESCRIPTION OF EMBODIMENTS

Figure 1:
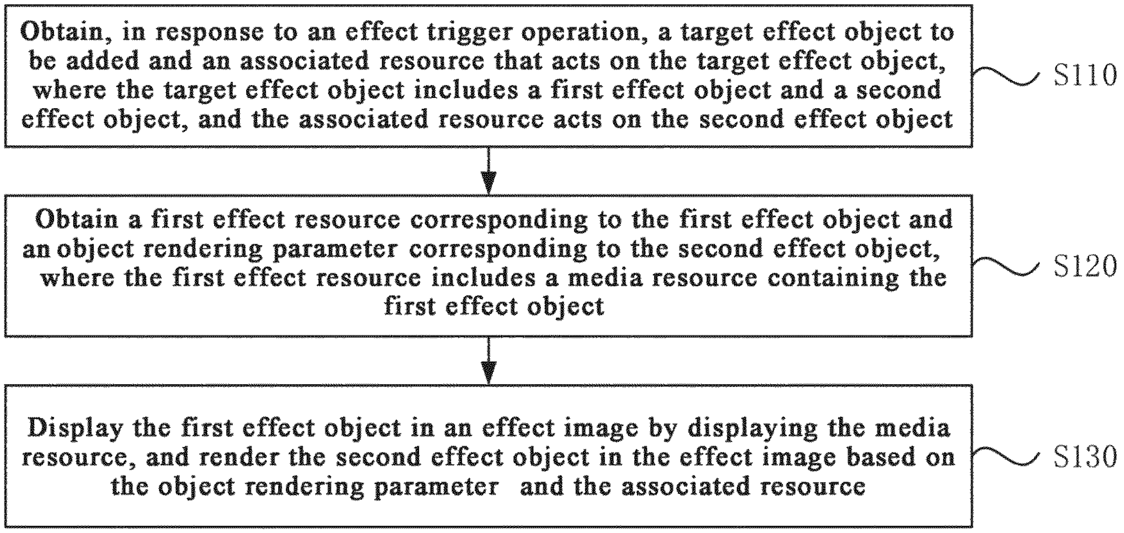
FIG. 1 is a schematic flowchart of an effect processing method according to embodiments of the present disclosure.

The embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. On the contrary, these embodiments are provided for a more thorough and complete understanding of the present disclosure. It should be understood that the accompanying drawings and the embodiments of the present disclosure are for exemplary purposes only, and are not intended to limit the scope of protection of the present disclosure.

It should be understood that the steps recorded in the method implementations of the present disclosure may be performed in different orders and/or in parallel. Further, additional steps may be included and/or the execution of the illustrated steps may be omitted in the method implementations. The scope of the present disclosure is not limited in this aspect.

The term "including" used herein and variations thereof are open-ended inclusions, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". Related definitions of other terms will be given in the description below.

It should be noted that concepts such as "first" and "second" mentioned in the present disclosure are only used to distinguish different apparatuses, modules, or units, and are not used to limit the order or relation of interdependence of functions performed by these apparatuses, modules, or units.

It should be noted that the modifiers "one" and "a plurality of" mentioned in the present disclosure are illustrative and not restrictive, and those skilled in the art should understand that unless otherwise explicitly specified in the context, the modifiers should be understood as "one or more".

The names of messages or information exchanged between a plurality of apparatuses in the implementations of the present disclosure are used for illustrative purposes only, and are not used to limit the scope of these messages or information.

It should be understood that before the use of the technical solutions disclosed in the embodiments of the present disclosure, a user shall be informed of the type, range of use, use scenarios, etc., of personal information involved in the present disclosure in an appropriate manner in accordance with relevant laws and regulations, and the authorization of the user shall be obtained.

For example, in response to reception of an active request from the user, a prompt message is sent to the user to clearly inform the user that a requested operation will require access to and use of the personal information of the user. As such, the user can independently choose, based on the prompt message, whether to provide the personal information to software or hardware, such as an electronic device, an application, a server, or a storage medium, that performs the operations of the technical solutions of the present disclosure.

As an optional but non-limiting implementation, in response to the reception of the active request from the user, the method for sending the prompt message to the user may be, for example, a pop-up window, in which the prompt message may be presented in text. Further, the pop-up window may also carry a selection control for the user to choose whether to "agree" or "disagree" to provide the personal information to the electronic device.

It should be understood that the above notification and user authorization obtaining process is only illustrative, which does not limit the implementations of the present disclosure, and other methods that comply with the relevant laws and regulations may also be applied to the implementations of the present disclosure.

It should be understood that data (including but not limited to the data itself, and data acquisition, or usage) involved in the technical solutions should comply with the requirements of the corresponding laws and regulations, and relevant stipulations.

In related effect processing technologies, in a case that dealing with a complex effect object, time for rendering the effect object is long, more space resources need to be occupied, meanwhile, the effect processing efficiency is low, and even the phenomenon of serious lag may occur. Embodiments of the present disclosure provide an effect processing method and apparatus, an electronic device, and a storage medium, to achieve high-efficiency effect processing.

According to the technical solution of this embodiment of the present disclosure, in response to the effect trigger operation, the target effect object to be added and the associated resource to be used on the target effect object are obtained, and because the target effect object includes the first effect object and the second effect object, the associated resource is to be used on the second effect object, and the target effect object and the associated resource may be used as components of the effect, thereby providing richer effect elements for the effect image; by obtaining the first effect resource corresponding to the first effect object and the object rendering parameter corresponding to the second effect object, data support is provided for effect rendering; because the first effect resource includes the media resource containing the first effect object, by displaying the media resource, the first effect object is displayed in the effect image without being rendered, thereby saving the object rendering time; and the second effect object is rendered in the effect image based on the object rendering parameter and the associated resource, and through a method for real-time rendering of the second effect object, a diverse setting of the associated resource to be used on the second effect object is supported, the technical problems about a humdrum effect display effect and long effect rendering time are solved, the effect processing efficiency is improved, and the display effect of the effect image is enriched.

FIG. 1 is a schematic flowchart of an effect processing method according to embodiments of the present disclosure. This embodiment of the present disclosure is applicable to a case of deleting an object and restoring the object after deletion. The method may be performed by an effect processing apparatus. The apparatus may be implemented in the form of software and/or hardware, and is optionally implemented by an electronic device. The electronic device may be a mobile terminal, a personal computer (PC) terminal, a server, or the like.

As shown in FIG. 1, the method in this embodiment may specifically include:

S110: Obtain, in response to an effect trigger operation, a target effect object to be added and an associated resource to be used on the target effect object, where the target effect object includes a first effect object and a second effect object, and the associated resource is to be used on the second effect object.

The effect trigger operation may be understood as an operation for displaying an effect after triggering. For example, the effect trigger operation may be a control trigger operation that acts on a preset effect trigger control, or a trigger operation that inputs a preset effect trigger action, or a trigger operation that inputs a preset effect trigger sound, or a trigger operation that detects a preset effect trigger event, etc. The effect trigger event may reach a preset effect time, etc.

Optionally, the target effect object is an effect object rendered based on a pre-established three-dimensional object model. The target effect object may be an effect object composed of the first effect object and the second effect object. The first effect object and the second effect object may be respectively obtained through rendering based on two separate three-dimensional object models, or may be respectively obtained by rendering two parts of one three-dimensional object model.

Specifically, the associated resource may be understood as a resource that is displayed in association with the second effect object in an effect image. Exemplarily, the associated resource may include information displayed in the image, such as multimedia data. The multimedia data may include at least one type of data such as image data, text data, animation data, and video data.

Exemplarily, the first effect object may be a stage, the second effect object may be a patch associated with the stage, and the associated resource may be an image or a video displayed based on the patch. In other words, the associated resource may be a mapping resource for the patch.

After receiving the effect trigger operation, optionally, the step of obtaining a target effect object to be added includes: setting a preset target effect object as the target effect object to be added, or displaying at least one candidate object identification; and setting, in response to a selection trigger operation for the candidate object identification, an effect object corresponding to the selected candidate object identification as the target effect object to be added.

Similarly, the step of obtaining the associated resource to be used on the target effect object includes: displaying at least one candidate resource identification; and setting, in response to a selection trigger operation for the candidate resource identification, a resource corresponding to the selected candidate resource identification as the associated resource to be used on the target effect object.

In this embodiment of the present disclosure, there may be a plurality of methods for the associated resource to act on the second effect object. Exemplarily, the associated resource may be displayed in at least a partial area of the second effect object. For example, in a case that the associated resource includes the multimedia data, the multimedia data may be displayed in at least the partial area of the second effect object.

Exemplarily, the associated resource may be displayed in association with the second effect object based on preset relative display information. The relative display information may include a relative display distance and/or a relative display angle.

Optionally, after the obtaining the target effect object to be added, the target effect object may be determined. Specifically, in a case that the target effect object is a preset effect object, the target effect object may be split into a first effect object and a second effect object. For example, an effect object identification corresponding to the target effect object may be compared with an effect object identification corresponding to the preset effect object, and whether the target effect object is the preset effect object is determined based on a comparison result.

S120: Obtain a first effect resource corresponding to the first effect object and an object rendering parameter corresponding to the second effect object, where the first effect resource includes a media resource containing the first effect object.

The first effect resource may be understood as a resource used to display the first effect object in the effect image. Exemplarily, the media resource includes one or more of texts, graphics, images, videos, and other resources. In this embodiment of the present disclosure, the media resource may be an effect resource obtained by rendering, in an offline environment, a first three-dimensional model corresponding to the first effect object. An offline rendering method is used, which can save the real-time rendering time, and is especially suitable for the complex first effect object, thereby improving the rendering efficiency of the first effect object.

Optionally, before the response to an effect trigger operation, the method further includes: obtaining a first three-dimensional model corresponding to the first effect object; obtaining object video data by rendering the first three-dimensional model based on a preset first rendering camera parameter; and storing the object video data and the first rendering camera parameter as the first effect resource. The first rendering camera parameter may be understood as a parameter of a rendering camera in a case that obtaining the media resource through rendering based on the first three-dimensional model of the first effect object.

Specifically, the object video data and the first rendering camera parameter may be used as the first effect resource to be correspondingly stored in a target storage space together with the object identification of the first effect object. Based on this, the first effect resource corresponding to the first effect object may be obtained from the target storage space based on the object identification. By adopting the technical solution, the first effect resource corresponding to the first effect object can be easily and quickly obtained.

The object rendering parameter is a rendering parameter used in a case that rendering the second effect object. Exemplarily, the object rendering parameter may include a skeletal animation parameter and a camera animation parameter; and may also include at least one of rendering parameters such as a lighting parameter, a rendering material, a rendering texture, and a second rendering camera parameter. The second rendering camera parameter may be understood as a camera parameter used by the rendering camera in a case that rendering the second effect object.

Exemplarily, a second three-dimensional model of the second effect object and a target rendering parameter of a rendering camera (which may be the same as the rendering camera corresponding to the first effect object) corresponding to the second effect object, and the target rendering parameter is exported as a target rendering file in a preset format. Specifically, the target rendering file may be understood as a model file including a skeletal animation parameter and a camera animation parameter. Then, in a case that the second effect object is rendered, the target rendering file may be obtained, the rendering camera corresponding to the second effect object is determined based on the target rendering file, and therefore the second effect object is rendered based on the rendering camera.

Optionally, object rendering parameter corresponding to the second effect object is obtained, including: obtaining pre-stored object rendering parameter corresponding to the second effect object; or, after obtaining a first effect resource corresponding to the first effect object, further determining an object rendering parameter corresponding to the second effect object based on the first effect resource.

S130: Display the media resource so as to display the first effect object in the effect image, and render the second effect object in the effect image based on the object rendering parameter and the associated resource.

It should be noted that in the effect image, only the target effect object and the associated resource can be included, and contents in addition to the target effect object and the associated resource may also be included, such as camera captured images or other uploaded resources (including images or videos).

Optionally, the media resource is played, including: playing the media resource based on preset playback information. The preset playback information includes at least one of a preset playback time, a preset playback speed, and a preset playback mode. The preset playback time may include a preset playback time point and/or a preset playback duration, etc. The preset playback mode may be a continuous playback mode or an intermittent playback mode, etc.

Optionally, the second effect object in the effect image is rendered based on the object rendering parameter and the associated resource, including: obtaining a second three-dimensional model corresponding to the second effect object, and rendering the second three-dimensional model in the effect image based on the target camera parameter and the associated resource, to display the associated resource in at least a partial area of the second effect object. The second three-dimensional model may be a three-dimensional model distinct from the first three-dimensional model, or may also be a partial model of the first three-dimensional model.

By adopting the technical solution, an effect that the multimedia data is displayed in at least the partial area of the second effect object through a method of real-time rendering of the second effect object. The technical solution may be applied to the multimedia data of any content, establishing a connection between the second effect object and the associated resource, thereby enriching a display effect of the second effect object.

In this embodiment of the present disclosure, optionally, after the step of displaying the media resource so as to display the first effect object in the effect image, the method further includes: adjusting video display information in a case that the media resource is to be used on the effect image, and displaying the first effect object in the effect image based on the adjusted video display information. By adopting the technical solution, after displaying the first effect object in the effect image, the adjustment of the media resource in the effect image may be supported, thereby achieving a diverse display effect of the first effect object, improving an adaptive method between the first effect object and a display area, and allowing the first effect object to present a varying display effect in the effect image.

The video display information may be understood as display information used in a case that the media resource is displayed in the effect image. The video display information includes at least one of a video display size, a video display position, a video resolution, a video display angle, and a video display style.

In this embodiment of the present disclosure, there may be a plurality of methods for adjusting the media resource. Optionally, the adjusting video display information in a case that the media resource is to be used on the effect image specifically includes: adjusting, in response to a video adjustment operation for the media resource, the video display information in a case that the media resource is to be used on the effect image. By adopting the technical solution, custom adjustments to the media resource may be supported, thereby achieving a varying effect.

The video adjustment operation may be understood as a trigger operation used to adjust the video display information of the media resource in the effect image. Exemplarily, the video adjustment operation may include at least one of trigger operations such as a trigger operation for moving a display position of the media resource, a trigger operation for adjusting a display size of the media resource, a trigger operation for adjusting a display color of the media resource, and a trigger operation for adjusting a motion trajectory of the media resource.

Exemplarily, there may be a plurality of methods for generating the video adjustment operation. For example, the video adjustment operation may be generated by triggering a preset object adjustment control, or may also be generated based on preset action information or preset sound information.

As an optional embodiment of the present disclosure, timing information of the media resource and the second effect object may be adjusted, such that the first effect object rendered offline and the second effect object rendered on a canvas in real time are kept aligned in time.

According to the technical solution of this embodiment of the present disclosure, in response to the effect trigger operation, the target effect object to be added and the associated resource to be used on the target effect object are obtained, and because the target effect object includes the first effect object and the second effect object, the associated resource is to be used on the second effect object, and the target effect object and the associated resource may be used as components of the effect, thereby providing richer effect elements for the effect image; by obtaining the first effect resource corresponding to the first effect object and the object rendering parameter corresponding to the second effect object, data support is provided for effect rendering; because the first effect resource includes the media resource containing the first effect object, by displaying the media resource, the first effect object is displayed in the effect image without being rendered, thereby saving the object rendering time; and the second effect object is rendered in the effect image based on the object rendering parameter and the associated resource, and through a method for real-time rendering of the second effect object, a diverse setting of the associated resource to be used on the second effect object is supported, the technical problems about a humdrum effect display effect and long effect rendering time are solved, the effect processing efficiency is improved, and the display effect of the effect image is enriched.

Figure 2:
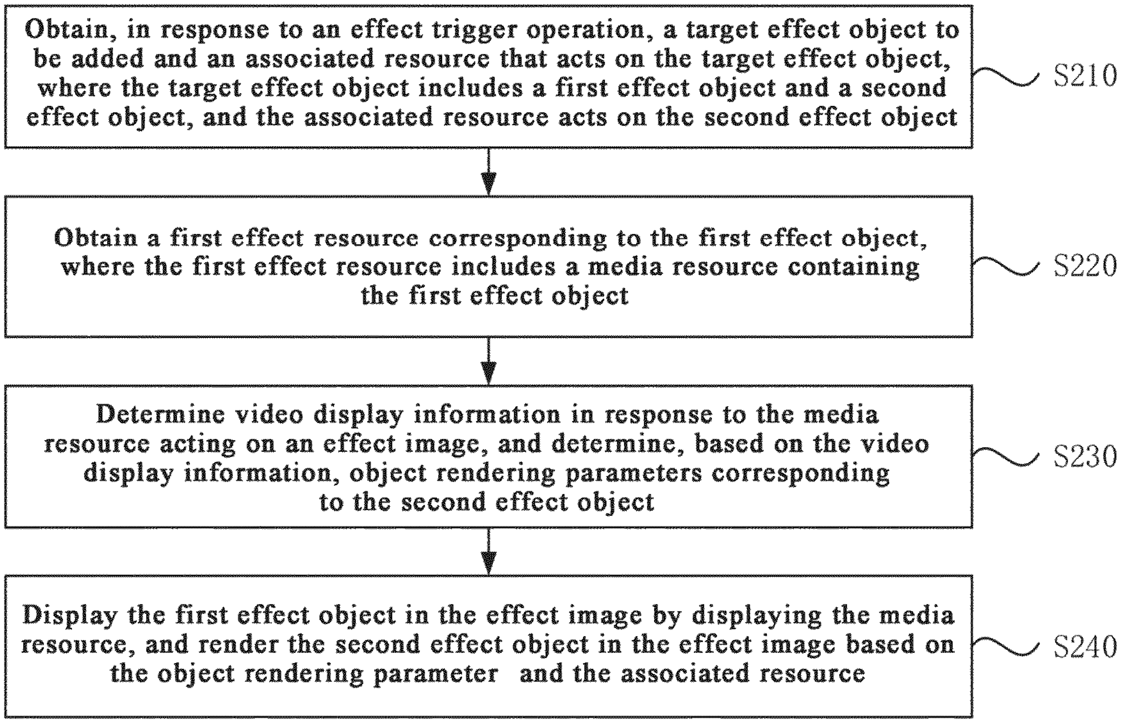
FIG. 2 is a schematic flowchart of another effect processing method according to embodiments of the present disclosure.

FIG. 2 is a schematic flowchart of another effect processing method according to embodiments of the present disclosure. According to the technical solution of this embodiment, based on the above embodiment, a method for determining an object rendering parameter corresponding to a second effect object is further refined. Optionally, video display information in a case that the media resource is to be used on an effect image is determined, and the object rendering parameter corresponding to the second effect object is determined based on the video display information. For a specific implementation, reference may be made to the description of this embodiment. Technical features that are the same with or similar to those in the above embodiment are not repeated herein.

As shown in FIG. 2, the method in this embodiment may specifically include:

S210: Obtain, in response to an effect trigger operation, a target effect object to be added and an associated resource to be used on the target effect object, where the target effect object includes a first effect object and a second effect object, and the associated resource is to be used on the second effect object.

S220: Obtain a first effect resource corresponding to the first effect object, where the first effect resource includes a media resource containing the first effect object.

S230: Determine video display information in a case that the media resource is to be used on an effect image, and determine, based on the video display information, an object rendering parameter corresponding to the second effect object.

In this embodiment of the present disclosure, the video display information in a case that the media resource is to be used on the effect image may be set according to actual needs, and specific attribute data corresponding to the video display information is not specifically limited.

Exemplarily, the video display information in a case that the media resource is to be used on the effect image is determined based on an image display area and a preset adaptive method between the media resource and the image display area; or, original display information of the media resource is obtained as the video display information in a case that the media resource is to be used on the effect image. The preset adaptive method may be a height alignment adaptive method, a width alignment adaptive method, or an area size alignment adaptive method.

Optionally, based on the video display information, an object rendering parameter corresponding to the second effect object is determined, including: obtaining a first rendering camera parameter corresponding to the media resource, and determining, based on the video display information and the first rendering camera parameter, a second rendering camera parameter corresponding to the second effect object. The second rendering camera parameter may be understood as a camera parameter of a rendering camera used in a case that rendering the second effect object.

By adopting the technical solution, the second rendering camera parameter corresponding to the second effect object may be determined through the first rendering camera parameter corresponding to the media resource, and even though the first effect object and the second effect object are not simultaneously rendered or not rendered in the same rendering space, it may be ensured that the first effect object and the second effect object in the target effect object present a preset relative display effect.

As an optional technical solution of this embodiment of the present disclosure, in response to the video display information being changed relative to the original display information of the media resource and the video display information being changed being first preset display information, the first rendering camera parameter may be adjusted based on the video display information so as to obtain the second rendering camera parameter corresponding to the second effect object. By adopting the technical solution, in a case that the video display information undergoes preset changes, the first rendering camera parameter is adjusted in real time based on the video display information to obtain the second rendering camera parameter, such that a rendering effect of the second effect object and the first effect object present a preset relative display effect.

The original display information of the media resource may be understood as display information used by the media resource in a case that the media resource is obtained through rendering based on a first three-dimensional model of the first effect object. Specifically, the original display information of the media resource may be understood as display information used by the media resource in a case that the media resource is obtained by rendering the first three-dimensional model of the first effect object based on the first rendering camera parameter.

In this embodiment of the present disclosure, the first preset display information may include display information obtained by converting the camera parameter of the rendering camera. Exemplarily, the first preset display information includes at least one of display information such as a target display position, a target display size, and a canvas resolution. The camera parameter may include at least one of parameters such as a field-of-view angle, a focal length, and a film size. The canvas resolution may be understood as the resolution of a canvas used to render the first effect object and the second effect object. The setting has the advantages that under different canvas resolutions and adaptation requirements, the media resource rendered offline and the second effect object rendered in real time can still be kept aligned and automatically adapted.

Specifically, parameter transformation information for the first rendering camera parameter may be determined based on the video display information, and parameter transformation is performed on the first rendering camera parameter based on the parameter transformation information, thereby obtaining the second rendering camera parameter corresponding to the second effect object. The parameter transformation information is associated with the parameter type of the first rendering camera parameter. For example, in a case that the first rendering camera parameter includes the field-of-view angle, the parameter transformation information may include field-of-view angle transformation information, and in a case that the first rendering camera parameter includes the canvas resolution, the parameter transformation information may include a projection matrix corresponding to the first three-dimensional model of the first effect object, etc.

As another optional technical solution of this embodiment of the present disclosure, in response to the video display information being unchanged relative to the original display information of the media resource or the video display information being changed being second preset display information, the first rendering camera parameter is determined as the second rendering camera parameter corresponding to the second effect object.

The second preset display information is distinct from the first preset display information. Specifically, the second preset display information may be other video display information except for the first preset display information. Exemplarily, the second preset display information may include display information unrelated to changes in a shooting parameter of the rendering camera. The video display information being unchanged relative to the original display information of the media resource may be understood as the media resource being displayed in the effect image with the original display information.

By adopting the technical solution, in response to the video display information being unchanged, the first rendering camera parameter is determined as the second rendering camera parameter used for rendering the second effect object, thereby achieving parameter synchronization between the first rendering camera parameter and the second rendering camera parameter and precisely ensuring a rendering effect of the second effect object.

S240: Display the media resource so as to display the first effect object in the effect image, and render the second effect object in the effect image based on the object rendering parameter and the associated resource.

According to the technical solution of this embodiment of the present disclosure, by determining the video display information in a case that the media resource is to be used on the effect image, the display information of the first effect object in the effect image can be obtained; and then, the object rendering parameter corresponding to the second effect object is determined based on the video display information, that is, the object rendering parameter of the second effect object is determined through the display information of the first effect object, thereby ensuring a relative display mode of the first effect object and the second effect object in the effect image, ensuring an overall display effect of the target effect object, and then ensuring the display effect of the effect image.

Figure 3:
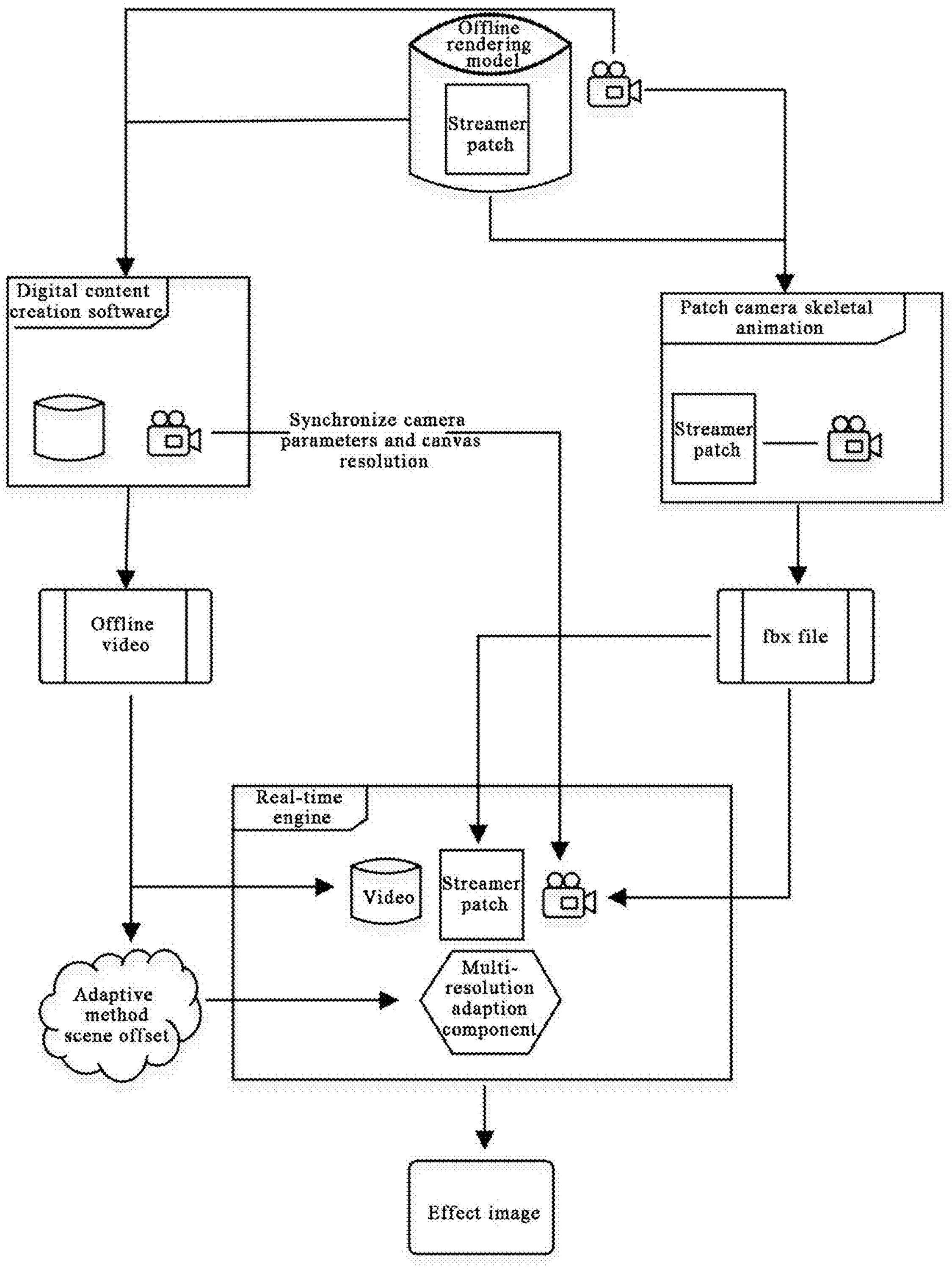
FIG. 3 is a schematic diagram of a whole process of an optional example of an effect processing method according to embodiments of the present disclosure.

FIG. 3 is a schematic diagram of a whole process of an optional example of an effect processing method according to embodiments of the present disclosure. As shown in FIG. 3, in a live streaming scenario, a target effect object to be added includes a first effect object rendered offline and a second effect object rendered in real time. An associated resource acting on the target effect object is a streamer image, and a part rendered in real time is a patch used to display the streamer image, referred to as a streamer patch.

For the first effect object rendered offline, a preset high-precision first three-dimensional model corresponding to the first effect object may be used for rendering in an offline rendering tool (e.g., offline digital content creation software) to obtain an offline video containing the first effect object. A first rendering camera parameter and a canvas resolution parameter used for rendering the first effect object are recorded. In this case, a part except for the streamer patch is rendered, a prefabricated content model (i.e., a second three-dimensional model corresponding to the second effect object) is involved, but does not participate in rendering, that is, assuming that one patch participates in rendering, it is convenient to subsequently replace display materials on the patch. Then, corresponding camera motion information and content model data are exported to a model for real-time rendering, and frame rate information the same as frame rate information of the first effect object is used. In this case, a first rendering camera needs to be used as a node to be added to a skeletal animation. Specifically, a file including a skeletal animation parameter and a camera animation parameter may be generated, such as an fxb file.

For the second effect object rendered in real time, the same camera parameter as used in an offline rendering part is used in a real-time engine, and the camera parameter is adjusted according to the resolution of a current real-time rendering canvas, such as modifying a field-of-view angle or a projection matrix. A map (e.g., the streamer image) of the second effect object is replaced according to needs, and a content patch model is rendered in real time.

Figure 4:
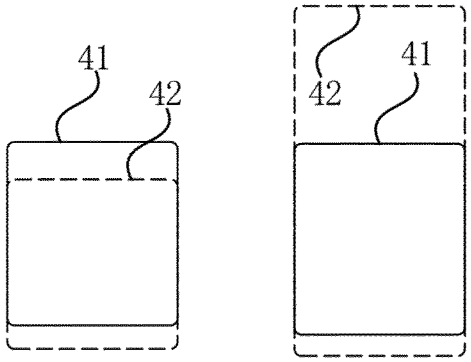
FIG. 4 is a schematic diagram of an offline video and screen adaptive method of an effect processing method according to embodiments of the present disclosure.

In a synthesis application stage, an offline video is added as a background in the real-time engine, and a real-time rendered part is overlaid. Because an offline rendering engine and a real-time rendering engine may be different, a screen display parameter for displaying the effect image may also vary. Therefore, relevant camera parameter may be adjusted in real time based on the video display information and the screen display parameter, and therefore under different canvas resolutions and adaptation requirements, an offline video and a real-time rendered scene may be kept aligned in space, and automatically adapted. As shown in FIG. 4, an offline video 42 is adjusted to be spatially aligned with different effect image display screens 41 through a width adjustment and alignment method. Spatial alignment may be understood as adjusting the offline video 42, such that a display position of the first effect object on the effect image display screen 41 is located within a preset area. Further, a relevant time sequence (e.g., a playback progress of the offline video) may also be adjusted, such that the offline video and the real-time rendered scene are kept temporally aligned.

In the technical solution, the high-quality offline video is used, the display effect of the target effect object is ensured, and meanwhile time and space resources occupied by real-time rendering may also be saved. Additionally, through real-time rendering of the second effect object, the replacement of content (associated resource) in the real-time rendered scene may be supported. Offline video materials may be spatially and temporally aligned with the real-time rendered scene, and may still be kept aligned with the real-time rendered scene under different resolutions, thereby effectively ensuring the effect.

Figure 5:
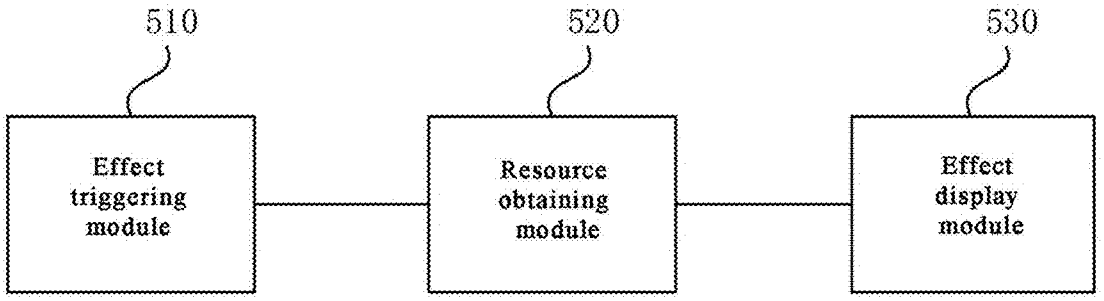
FIG. 5 is a schematic diagram of a structure of an effect processing apparatus according to embodiments of the present disclosure.

FIG. 5 is a schematic diagram of a structure of an effect processing apparatus according to embodiments of the present disclosure. As shown in FIG. 5, the effect processing apparatus includes: an effect triggering module 510, a resource obtaining module 520, and an effect display module 530. The effect triggering module 510 is configured to obtain, in response to an effect trigger operation, a target effect object to be added and an associated resource to be used on the target effect object, where the target effect object includes a first effect object and a second effect object, and the associated resource is to be used on the second effect object; the resource obtaining module 520 is configured to obtain a first effect resource corresponding to the first effect object and an object rendering parameter corresponding to the second effect object, where the first effect resource includes a media resource containing the first effect object; and the effect display module 530 is configured to displaying the first effect object in an effect image by displaying the media resource, and render the second effect object in the effect image based on the object rendering parameter and the associated resource.

According to the technical solution of this embodiment of the present disclosure, the effect triggering module obtains, in response to the effect trigger operation, the target effect object to be added and the associated resource to be used on the target effect object, and since the target effect object includes the first effect object and the second effect object, the associated resource is to be used on the second effect object, and the target effect object and the associated resource may be used as components of the effect, thereby providing richer effect elements for the effect image; the resource obtaining module obtains the first effect resource corresponding to the first effect object and the object rendering parameter corresponding to the second effect object, thereby providing data support for effect rendering; since the first effect resource includes the media resource containing the first effect object, the effect display module displays the media resource so as to display the first effect object in the effect image, and there is no need to render the first effect object, thereby saving the object rendering time; and the second effect object is rendered in the effect image based on the object rendering parameter and the associated resource, and through the method for real-time rendering of the second effect object, the diverse setting of the associated resource to be used on the second effect object is supported, the technical problems about a humdrum effect display effect and long effect rendering time are solved, the effect processing efficiency is improved, and a display effect of the effect image is enriched.

Based on the above optional technical solutions, optionally, the effect triggering module 510 is specifically configured to: obtain, in response to a resource setting trigger operation for the target effect object, a preset target resource as an associated resource to be used on the target effect object.

Based on the above optional technical solutions, optionally, the effect processing apparatus includes an effect adjustment module. The effect adjustment module is configured to: adjust video display information in a case that the media resource is to be used on the effect image, and display the first effect object in the effect image based on the adjusted video display information.

Based on the above optional technical solutions, optionally, the effect adjustment module is specifically configured to: adjust, in response to a video adjustment operation for the media resource, the video display information in a case that the media resource is to be used on the effect image.

Based on the above optional technical solutions, optionally, the resource obtaining module 520 is specifically configured to: determine video display information in a case that the media resource is to be used on the effect image, and determine, based on the video display information, an object rendering parameter corresponding to the second effect object.

Based on the above optional technical solutions, optionally, the object rendering parameter includes a second rendering camera parameter. Correspondingly, the resource obtaining module 520 is further configured to: obtain a first rendering camera parameter corresponding to the media resource, and determine, based on the video display information and the first rendering camera parameter, second rendering camera parameter corresponding to the second effect object.

Based on the above optional technical solutions, optionally, the resource obtaining module 520 includes: a first parameter rendering parameter adjustment unit and/or a second parameter rendering parameter adjustment unit. The first parameter rendering parameter adjustment unit is configured to adjust the first rendering camera parameter based on the video display information so as to obtain the second rendering camera parameter corresponding to the second effect object in response to the video display information being changed relative to original display information of the media resource and the video display information being changed being first preset display information; and the second parameter rendering parameter adjustment unit is configured to use the first rendering camera parameter as the second rendering camera parameter corresponding to the second effect object in response to the video display information being unchanged relative to the original display information of the media resource or the video display information being changed being second preset display information.

Based on the above optional technical solutions, optionally, the first preset display information includes at least one of a target display position, a target display size, and a canvas resolution.

Based on the above optional technical solutions, optionally, the associated resource includes multimedia data, and the multimedia data is displayed in at least a partial area of the second effect object.

Based on the above optional technical solutions, optionally, the effect processing apparatus further includes an offline rendering module and an offline rendering module. The offline rendering module is configured to obtain a first three-dimensional model corresponding to the first effect object before the response to an effect trigger operation, and render the first three-dimensional model based on a preset first rendering camera parameter to obtain object video data; and the offline rendering module is configured to store the object video data and the first rendering camera parameter as the first effect resource.

The effect processing apparatus provided in this embodiment of the present disclosure may perform the effect processing method provided in any embodiment of the present disclosure, and has the corresponding functional modules and beneficial effects for performing the effect processing method.

It should be noted that the various units and modules included in the above apparatus are only divided according to functional logics, but are not limited to the above division, as long as the corresponding functions can be achieved; and in addition, the specific names of the functional units are only for the convenience of distinguishing each other, and are not used to limit the scope of protection of the embodiments of the present disclosure.

Figure 6:
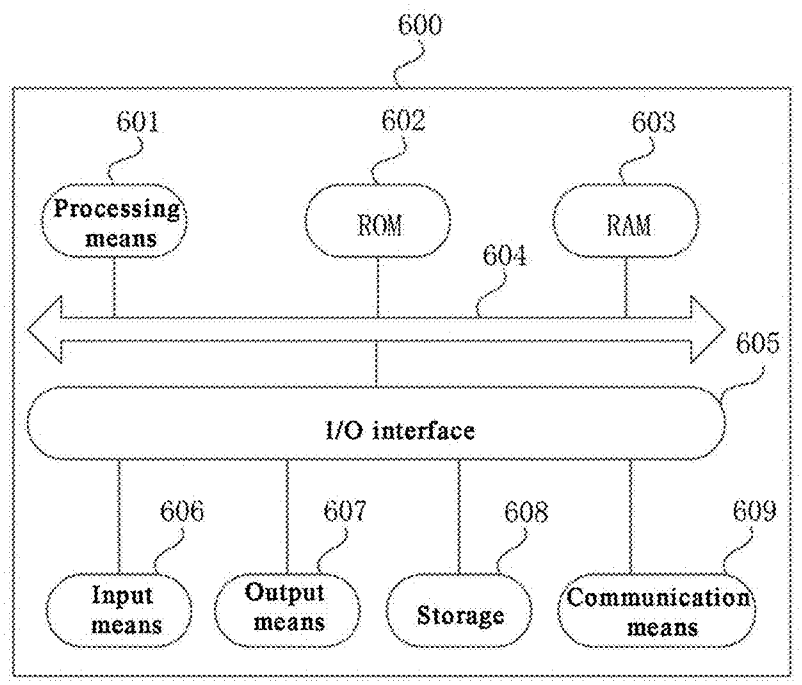
FIG. 6 is a schematic diagram of a structure of an electronic device according to embodiments of the present disclosure.

FIG. 6 is a schematic diagram of a structure of an electronic device according to embodiments of the present disclosure. Reference is made to FIG. 6 below, which is a schematic diagram of a structure of an electronic device (e.g., a terminal device or a server in FIG. 6) 600 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a portable Android device (PAD), a portable media player (PMP), and a vehicle-mounted terminal (e.g., a vehicle navigation terminal), and fixed terminals such as a digital TV and a desktop computer. The electronic device shown in FIG. 6 is merely an example, and shall not impose any limitation on the function and scope of use of the embodiments of the present disclosure.

As shown in FIG. 6, the electronic device 600 may include a processing means (e.g., a central processing unit and a graphics processing unit) 601, which may perform various appropriate actions and processing according to a program stored on a read-only memory (ROM) 602 or a program loaded from a storage 608 into a random access memory (RAM) 603. The RAM 603 further stores various programs and data required for the operation of the electronic device 600. The processing means 601, the ROM 602, and the RAM 603 are connected to one another through a bus 604. An input/output (I/O) interface 605 is also connected to the bus 604.

Typically, the following apparatuses may be connected to the I/O interface 605: an input means 606, including, for example, a touchscreen, a touchpad, a keyboard, a mouse, a camera, a microphone, an accelerometer, and a gyroscope; an output means 607, including, for example, a liquid crystal display (LCD), a speaker, and a vibrator; the storage 608, including, for example, a magnetic tape and a hard drive; and a communication means 609. The communication means 609 may allow the electronic device 600 to be in wireless or wired communication with other devices for data exchange. Although FIG. 6 illustrates the electronic device 600 with various apparatuses, it should be understood that it is not necessary to implement or have all the shown apparatuses. It may be an alternative to implement or have more or fewer apparatuses.

In particular, the above process described with reference to the flowcharts according to the embodiments of the present disclosure may be implemented as a computer software program. For example, an embodiment of the present disclosure includes a computer program product, which includes a computer program carried on a non-transitory computer-readable medium, where the computer program includes program code used to perform the method shown in the flowchart. In this embodiment, the computer program may be downloaded and installed from the network through the communication means 609, installed from the storage 608, or installed from the ROM 602. The computer program, in a case that executed by the processing means 601, performs the above functions limited in the method in this embodiment of the present disclosure.

The names of messages or information exchanged between a plurality of apparatuses in the implementations of the present disclosure are used for illustrative purposes only, and are not used to limit the scope of these messages or information.

The electronic device provided by this embodiment of the present disclosure and the effect processing method provided by the above embodiment belong to the same inventive concept, and for technical details not described in detail in this embodiment, reference may be made to the above embodiment. This embodiment and the above embodiment have the same beneficial effects.

An embodiment of the present disclosure provides a non-transitory computer storage medium, storing a computer program. The program, in a case that executed by a processor, implements the effect processing method provided in the above embodiment.

It should be noted that the above computer-readable medium described in the present disclosure may be a computer-readable signal medium, or a computer-readable storage medium, or any combination of the above. The computer-readable storage medium may be, for example, but is not limited to, electric, magnetic, optical, electromagnetic, infrared, or semiconductor systems, apparatuses, or devices, or any combination of the above. More specific examples of the computer-readable storage medium may include, but are not limited to: an electrical connection with one or more wires, a portable computer disk, a hard drive, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above. In the present disclosure, the computer-readable storage medium may be any tangible medium including or storing a program, and the program may be for use by or for use in combination with an instruction execution system, apparatus, or device. However, in the present disclosure, the computer-readable signal medium may include a data signal propagated in a baseband or as a part of a carrier, where the data signal carries computer-readable program code. The propagated data signal may take various forms, including but not limited to an electromagnetic signal, an optical signal, or any suitable combination of the above. The computer-readable signal medium may also be any computer-readable medium other than the computer-readable storage medium. The computer-readable signal medium may send, propagate, or transmit a program for use by or for use in combination with the instruction execution system, apparatus, or device. The program code included in the computer-readable medium may be transmitted by any suitable medium, including but not limited to a wire, an optical cable, radio frequency (RF), etc., or any suitable combination of the above.

In some implementations, a client and a server may communicate using any currently known or future-developed network protocols such as a hypertext transfer protocol (HTTP), and may be interconnected with digital data communication in any form or medium (e.g., a communication network). Examples of the communication network include a local area network ("LAN"), a wide area network ("WAN"), an internetwork (e.g., the Internet), a peer-to-peer network (e.g., an ad hoc peer-to-peer network), and any currently known or future-developed network.

The above computer-readable medium may be included in the above electronic device; or may also separately exist without being assembled in the electronic device.

The above computer-readable medium carries one or more programs. The above one or more programs, in a case that executed by the electronic device, cause the electronic device to: obtain, in response to an effect trigger operation, a target effect object to be added and an associated resource to be used on the target effect object, where the target effect object includes a first effect object and a second effect object, and the associated resource is to be used on the second effect object; obtain a first effect resource corresponding to the first effect object and an object rendering parameter corresponding to the second effect object, where the first effect resource includes a media resource containing the first effect object; and displaying the first effect object in an effect image by displaying the media resource, and render the second effect object in the effect image based on the object rendering parameter and the associated resource.

Computer program code for performing operations of the present disclosure may be written in one or more programming languages or a combination thereof, where the above programming languages include, but are not limited to, object-oriented programming languages, such as Java, Smalltalk, and C++, and further include conventional procedural programming languages, such as "C" language or similar programming languages. The program code may be executed entirely on a user computer, partly on the user computer, as a stand-alone software package, partly on the user computer and partly on a remote computer, or entirely on the remote computer or the server. In the case of involving the remote computer, the remote computer may be connected to the user computer through any type of network, including a local area network (LAN) or a wide area network (WAN), or may be connected to an external computer (e.g., utilizing an Internet service provider for Internet connectivity).

The flowcharts and the block diagrams in the accompanying drawings illustrate the possibly implemented system architecture, functions, and operations of the system, the method, and the computer program product according to the various embodiments of the present disclosure. In this regard, each block in the flowcharts or the block diagrams may represent a module, a program segment, or a part of code, and the module, the program segment, or the part of code contains one or more executable instructions for implementing specified logical functions. It should also be noted that in some alternative implementations, the functions marked in the blocks may also occur in an order different from that marked in the accompanying drawings. For example, two blocks shown in succession may actually be performed substantially in parallel, or may sometimes be performed in a reverse order, depending on the functions involved. It should also be noted that each block in the block diagrams and/or the flowcharts, and a combination of the blocks in the block diagrams and/or the flowcharts may be implemented by using a dedicated hardware-based system that performs specified functions or operations, or may be implemented by using a combination of dedicated hardware and computer instructions.

The related units described in the embodiments of the present disclosure may be implemented by software or hardware. The name of the unit does not limit the unit itself in certain cases. For example, the effect triggering module may also be described as "a module for obtaining a target effect object and associated resource".

Herein, the functions described above may be at least partially executed by one or more hardware logic components. For example, without limitation, exemplary hardware logic components that can be used include: a field-programmable gate array (FPGA), an application specific integrated circuit (ASIC), an application specific standard part (ASSP), a system on chip (SOC), a complex programmable logic device (CPLD), etc.

In the context of the present disclosure, a machine-readable medium may be a tangible medium that may include or store a program for use by or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include an electrical connection based on one or more wires, a portable computer disk, a hard drive, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above content.

According to one or more embodiments of the present disclosure, [Example 1] provides an effect processing method, including: obtaining, in response to an effect trigger operation, a target effect object to be added and an associated resource to be used on the target effect object, wherein the target effect object comprises a first effect object and a second effect object, and the associated resource is to be used on the second effect object; obtaining a first effect resource corresponding to the first effect object and an object rendering parameter corresponding to the second effect object, wherein the first effect resource comprises a media resource containing the first effect object; and displaying the first effect object in an effect image by displaying the media resource, and rendering the second effect object in the effect image based on the object rendering parameter and the associated resource.

According to one or more embodiments of the present disclosure, [Example 2] provides the method according to Example 1, further including: optionally, the obtaining the associated resource to be used on the target effect object including: obtaining, in response to a resource setting trigger operation for the target effect object, a preset target resource as the associated resource to be used on the target effect object.

According to one or more embodiments of the present disclosure, [Example 3] provides the method according to Example 1, further including: optionally, after the displaying the first effect object in an effect image by displaying the media resource, the method further including: adjusting video display information in a case that the media resource is to be used on the effect image, and displaying the first effect object in the effect image based on the adjusted video display information.

According to one or more embodiments of the present disclosure, [Example 4] provides the method according to Example 3, further including: optionally, the adjusting video display information in a case that the media resource is to be used on the effect image including: adjusting, in response to a video adjustment operation for the media resource, the video display information in a case that the media resource is to be used on the effect image.

According to one or more embodiments of the present disclosure, [Example 5] provides the method according to Example 1, further including: optionally, the determining an object rendering parameter corresponding to the second effect object including: determining video display information in a case that the media resource is to be used on the effect image, and determining, based on the video display information, the object rendering parameter corresponding to the second effect object.

According to one or more embodiments of the present disclosure, [Example 6] provides the method according to Example 1, further including: optionally, the object rendering a parameter including a second rendering camera parameter; and the determining, based on the video display information, the object rendering a parameter corresponding to the second effect object including: obtaining a first rendering camera parameter corresponding to the media resource, and determining, based on the video display information and the first rendering camera parameter, the second rendering camera parameter corresponding to the second effect object.

According to one or more embodiments of the present disclosure, [Example 7] provides the method according to Example 6, further including: optionally, the determining, based on the video display information and the first rendering camera parameter, the second rendering camera parameter corresponding to the second effect object including: obtaining the second rendering camera parameter corresponding to the second effect object by adjusting the first rendering camera parameter based on the video display information, in response to the video display information being changed relative to original display information of the media resource and the video display information being changed being first preset display information; and/or, determining the first rendering camera parameter as the second rendering camera parameter corresponding to the second effect object in response to the video display information being unchanged relative to the original display information of the media resource or the video display information being changed being second preset display information.

According to one or more embodiments of the present disclosure, [Example 8] provides the method according to Example 7, further including: optionally, the first preset display information including at least one of a target display position, a target display size, and a canvas resolution.

According to one or more embodiments of the present disclosure, [Example 9] provides the method according to Example 1, further including: optionally, before the response to an effect trigger operation, the method further including: obtaining a first three-dimensional model corresponding to the first effect object, and obtaining object video data by rendering the first three-dimensional model based on a preset first rendering camera parameter; and storing the object video data and the first rendering camera parameter as the first effect resource.

According to one or more embodiments of the present disclosure, [Example 10] provides the method according to Example 1, further including: optionally, the associated resource including multimedia data, and the multimedia data being displayed in at least a partial area of the second effect object.

According to one or more embodiments of the present disclosure, [Example 11] provides an effect processing apparatus, including an effect triggering module, configured to obtain, in response to an effect trigger operation, a target effect object to be added and an associated resource to be used on the target effect object, wherein the target effect object comprises a first effect object and a second effect object, and the associated resource is to be used on the second effect object; a resource obtaining module, configured to obtain a first effect resource corresponding to the first effect object and an object rendering a parameter corresponding to the second effect object, wherein the first effect resource comprises a media resource containing the first effect object; and an effect display module, configured to displaying the first effect object in an effect image by displaying the media resource, and render the second effect object in the effect image based on the object rendering parameter and the associated resource.

What are described above are only preferred embodiments of the present disclosure and explanations of the technical principles applied. Those skilled in the art should understand that the scope of the disclosure involved in the present disclosure is not limited to the technical solutions formed by specific combinations of the above technical features, and shall also cover other technical solutions formed by any combination of the above technical features or equivalent features thereof without departing from the above concept of disclosure, such as a technical solution formed by replacing the above features with the technical features with similar functions disclosed (but not limited to) in the present disclosure.

Further, although the operations are described in a particular order, it should not be understood as requiring these operations to be performed in the shown particular order or in a sequential order. In certain environments, multitasking and parallel processing may be advantageous. Similarly, although several specific implementation details are included in the above discussion, these specific implementation details should not be interpreted as limitations on the scope of the present disclosure. Some features that are described in the context of separate embodiments may also be implemented in combination in a single embodiment. In contrast, various features described in the context of a single embodiment may alternatively be implemented in a plurality of embodiments individually or in any suitable sub-combination.

Although the subject matter has been described in a language specific to structural features and/or logic actions of the method, it should be understood that the subject matter defined in the appended claims is not necessarily limited to the specific features or actions described above. On the contrary, the specific features and the actions described above are merely example forms for implementing the claims.

I claim:

1. An effect processing method, comprising:

obtaining, in response to an effect trigger operation, a target effect object to be added and an associated resource to be used on the target effect object, wherein the target effect object comprises a first effect object and a second effect object, and the associated resource is to be used on the second effect object;

obtaining a first effect resource corresponding to the first effect object and an object rendering parameter corresponding to the second effect object, wherein the first effect resource comprises a media resource containing the first effect object;

displaying the first effect object in an effect image by displaying the media resource; and rendering the second effect object in the effect image based on the object rendering parameter and the associated resource.

2. The effect processing method according to claim 1, wherein obtaining the associated resource to be used on the target effect object comprises:

obtaining, in response to a resource setting trigger operation for the target effect object, a preset target resource as the associated resource to be used on the target effect object.

3. The effect processing method according to claim 1, wherein after displaying the first effect object in the effect image by displaying the media resource, the method further comprises:

adjusting video display information in a case that the media resource is used on the effect image; and displaying the first effect object in the effect image based on the adjusted video display information.

4. The effect processing method according to claim 3, wherein adjusting the video display information in a case that the media resource is used on the effect image comprises:

adjusting, in response to a video adjustment operation for the media resource, the video display information in a case that the media resource is used on the effect image.

5. The effect processing method according to claim 1, wherein obtaining the object rendering parameter corresponding to the second effect object comprises:

determining video display information in a case that the media resource is used on the effect image; and determining, based on the video display information, the object rendering parameter corresponding to the second effect object.

6. The effect processing method according to claim 5, wherein the object rendering parameter comprises a second rendering camera parameter; and determining, based on the video display information, the object rendering parameter corresponding to the second effect object comprises:

obtaining a first rendering camera parameter corresponding to the media resource; and determining, based on the video display information and the first rendering camera parameter, the second rendering camera parameter corresponding to the second effect object.

7. The effect processing method according to claim 6, wherein determining, based on the video display information and the first rendering camera parameter, the second rendering camera parameter corresponding to the second effect object comprises:

obtaining the second rendering camera parameter corresponding to the second effect object by adjusting the first rendering camera parameter based on the video display information, in response to the video display information being changed relative to original display information of the media resource and the video display information being changed being first preset display information; and/or, determining the first rendering camera parameter as the second rendering camera parameter corresponding to the second effect object, in response to the video display information being unchanged relative to the original display information of the media resource or the video display information being changed being second preset display information.

8. The effect processing method according to claim 7, wherein the first preset display information comprises at least one of a target display position, a target display size, and a canvas resolution.

9. The effect processing method according to claim 1, wherein before the response to the effect trigger operation, the method further comprises:

obtaining a first three-dimensional model corresponding to the first effect object, and obtaining object video data by rendering the first three-dimensional model based on a preset first rendering camera parameter; and storing the object video data and the first rendering camera parameter as the first effect resource.

10. The effect processing method according to claim 1, wherein the associated resource comprises multimedia data, and the multimedia data is displayed in at least a partial area of the second effect object.

11. An electronic device, comprising one or more processors; and a storage, configured to store one or more programs, wherein the one or more programs, in a case that executed by the one or more processors, cause the one or more processors to:

obtain, in response to an effect trigger operation, a target effect object to be added and an associated resource to be used on the target effect object, wherein the target effect object comprises a first effect object and a second effect object, and the associated resource is to be used on the second effect object;

obtain a first effect resource corresponding to the first effect object and an object rendering parameter corresponding to the second effect object, wherein the first effect resource comprises a media resource containing the first effect object;

display the first effect object in an effect image by displaying the media resource; and render the second effect object in the effect image based on the object rendering parameter and the associated resource.

12. The device processing method according to claim 11, wherein the one or more programs causing the one or more processors to obtain the associated resource to be used on the target effect object further cause the one or more processors to:

obtain, in response to a resource setting trigger operation for the target effect object, a preset target resource as the associated resource to be used on the target effect object.

13. The device processing method according to claim 11, wherein the one or more programs further cause the one or more processors to, after displaying the first effect object in the effect image by displaying the media resource:

adjust video display information in a case that the media resource is used on the effect image; and display the first effect object in the effect image based on the adjusted video display information.

14. The device processing method according to claim 13, wherein the one or more programs causing the one or more processors to adjust the video display information in a case that the media resource is used on the effect image further cause the one or more processors to:

adjust, in response to a video adjustment operation for the media resource, the video display information in a case that the media resource is used on the effect image.

15. The device processing method according to claim 11, wherein the one or more programs causing the one or more processors to obtain the object rendering parameter corresponding to the second effect object further cause the one or more processors to:

determine video display information in a case that the media resource is used on the effect image; and determine, based on the video display information, the object rendering parameter corresponding to the second effect object.

16. The device processing method according to claim 15, wherein the object rendering parameter comprises a second rendering camera parameter; and the one or more programs causing the one or more processors to determine, based on the video display information, the object rendering parameter corresponding to the second effect object further cause the one or more processors to:

obtain a first rendering camera parameter corresponding to the media resource; and determine, based on the video display information and the first rendering camera parameter, the second rendering camera parameter corresponding to the second effect object.

17. The device processing method according to claim 16, wherein the one or more programs causing the one or more processors to determine, based on the video display information and the first rendering camera parameter, the second rendering camera parameter corresponding to the second effect object further cause the one or more processors to:

obtain the second rendering camera parameter corresponding to the second effect object by adjusting the first rendering camera parameter based on the video display information, in response to the video display information being changed relative to original display information of the media resource and the video display information being changed being first preset display information; and/or, determine the first rendering camera parameter as the second rendering camera parameter corresponding to the second effect object, in response to the video display information being unchanged relative to the original display information of the media resource or the video display information being changed being second preset display information.

18. The device processing method according to claim 17, wherein the first preset display information comprises at least one of a target display position, a target display size, and a canvas resolution.

19. The device processing method according to claim 11, wherein the one or more programs further cause the one or more processors to, before the response to the effect trigger operation:

obtain a first three-dimensional model corresponding to the first effect object, and obtain object video data by rendering the first three-dimensional model based on a preset first rendering camera parameter; and store the object video data and the first rendering camera parameter as the first effect resource.

20. A non-transitory storage medium comprising computer-executable instructions, wherein the computer-executable instructions, when executed by a computer processor, cause the computer processor to:

obtain, in response to an effect trigger operation, a target effect object to be added and an associated resource to be used on the target effect object, wherein the target effect object comprises a first effect object and a second effect object, and the associated resource is to be used on the second effect object;

obtain a first effect resource corresponding to the first effect object and an object rendering parameter corresponding to the second effect object, wherein the first effect resource comprises a media resource containing the first effect object;

display the first effect object in an effect image by displaying the media resource; and render the second effect object in the effect image based on the object rendering parameter and the associated resource.

* * * * *